United States Patent [19]

Papenhagen et al.

[11] Patent Number: 5,794,489

[45] Date of Patent: Aug. 18, 1998

[54] CONTROL PEDAL UNIT FOR MOTOR VEHICLES

[75] Inventors: Dieter Papenhagen, Waiblingen; Manfred Löchle, Stuttgart; Thorsten Meyer, Fellbach, all of Germany

[73] Assignee: Mercedes-Benz AG, Stuttgart, Germany

[21] Appl. No.: 692,498

[22] Filed: Aug. 5, 1996

[30] Foreign Application Priority Data

Aug. 29, 1995 [DE] Germany ............... 195 31 732.7

[51] Int. Cl.⁶ ........................................... G05G 1/14
[52] U.S. Cl. ........................................... 74/513; 74/560
[58] Field of Search ............... 74/512, 513, 514, 74/560

[56] References Cited

U.S. PATENT DOCUMENTS

| | | | |
|---|---|---|---|
| 1,829,028 | 10/1931 | Woller | 74/513 |
| 3,869,279 | 3/1975 | Grimes et al. | 74/560 X |
| 4,543,850 | 10/1985 | Bednar et al. | 74/560 X |

FOREIGN PATENT DOCUMENTS

| | | | |
|---|---|---|---|
| 0 430 600 | 6/1991 | European Pat. Off. | |
| 27 28 787 | 1/1979 | Germany. | |
| 28 15 769 | 10/1979 | Germany. | |
| 3634003 | 4/1988 | Germany | 74/512 |
| 4029155 | 4/1991 | Germany | 74/512 |
| 54615 | 3/1988 | Japan | 74/512 |
| 3262731 | 11/1991 | Japan | 74/512 |
| 6 156110 | 6/1994 | Japan. | |
| WO 86/00732 | 1/1986 | WIPO | 74/512 |
| WO 94/29584 | 12/1994 | WIPO. | |

*Primary Examiner*—Charles A. Marmor
*Assistant Examiner*—Mary Ann Battista
*Attorney, Agent, or Firm*—Klaus J. Bach

[57] ABSTRACT

In a vehicle control pedal unit comprising a mounting structure having a U-shaped mounting end with spaced parallel leg walls between which one end of a pedal lever is pivotally supported to which a pedal is attached at its other end, a cover is disposed, and pivotally supported with one end, on the spaced parallel leg walls for at least partially closing the space between the leg walls and a return spring having one end attached to the pivot lever is disposed in the space between the parallel leg walls and connected with its other end to the cover for resiliently holding said cover in a closed position in engagement with the leg walls and biasing the pivot lever into an idle end position.

8 Claims, 6 Drawing Sheets

5,794,489

CONTROL PEDAL UNIT FOR MOTOR VEHICLES

BACKGROUND OF THE INVENTION

The invention relates to control pedal units for vehicles with a pedal mounted on a pedal lever which is pivotally supported on a pedal support structure and the pedal lever is engaged by a return spring biasing the pedal lever to a rest position.

EP 0 430 600 A1 discloses a vehicle control pedal unit including pedal levers with pedals mounted thereon. A spiral return spring is provided for biasing the lever to an engine idle position.

Such vehicle control pedal units are also known from DE-OS 2815 769 and from DE OS 2728 787. Here, the pedal lever is supported on a vehicle wall which includes a support structure with bearing openings.

However, these vehicle control pedal units are relatively complicated in their designs and their installation during assembly of the vehicle is time consuming. This is particularly true for the installation of the return spring and its connection to the respective control pedal parts.

It is therefore the object of the present invention to provide an control pedal unit which does not have the disadvantages of the prior art units referred to above, specifically to provide an control pedal unit which is suitable for efficient manufacture in series and for preassembly to such a degree that even the return spring can be installed in the unit before installation in a vehicle.

Furthermore, the control pedal unit should be suitable for an electric or electronic transmission of position signals to the internal combustion engine instead of the use of a cable connection.

SUMMARY OF THE INVENTION

In a vehicle control pedal unit comprising a mounting structure having a U-shaped mounting end with spaced parallel leg walls between which one end of a pedal lever is pivotally supported to which a pedal is attached at its other end, a cover is disposed on and pivotally supported with one end on the spaced parallel leg walls for at least partially closing the space between the leg walls and a return spring having one end attached to the pedal lever is disposed in the space between the parallel leg walls and connected with its other end to the cover for resiliently holding the cover in a closed position in engagement with the leg walls and biasing the pedal lever into an idle end position.

Because of this arrangement and the interconnection of the various control pedal components, particularly the cover, preassembly of the pedal unit is facilitated. Even the return springs required for the return of the pedal can be preinstalled by connection to the cover. This results in a noticeable simplification for a more efficient assembly. At the same timer the return springs are protected from damages and from soiling since they are disposed below a cover.

For the assembly, the return springs which are hooked into the pedal lever can be attached to the cover before the cover is mounted and the cover can then be pivoted about a pivot axis in position in such a way that it covers the leg walls of the support structure. For installation in a vehicle, the whole preassembled control pedal unit is then mounted on predetermined place at the vehicle wall which generally is the firewall or the splash wall of the vehicle.

Advantageous embodiments of the invention will be described below on the basis of the accompanying drawings.

BRIEF DESCRIPTIONS OF THE DRAWINGS

DESCRIPTION OF PREFERRED EMBODIMENTS

Figure 1:
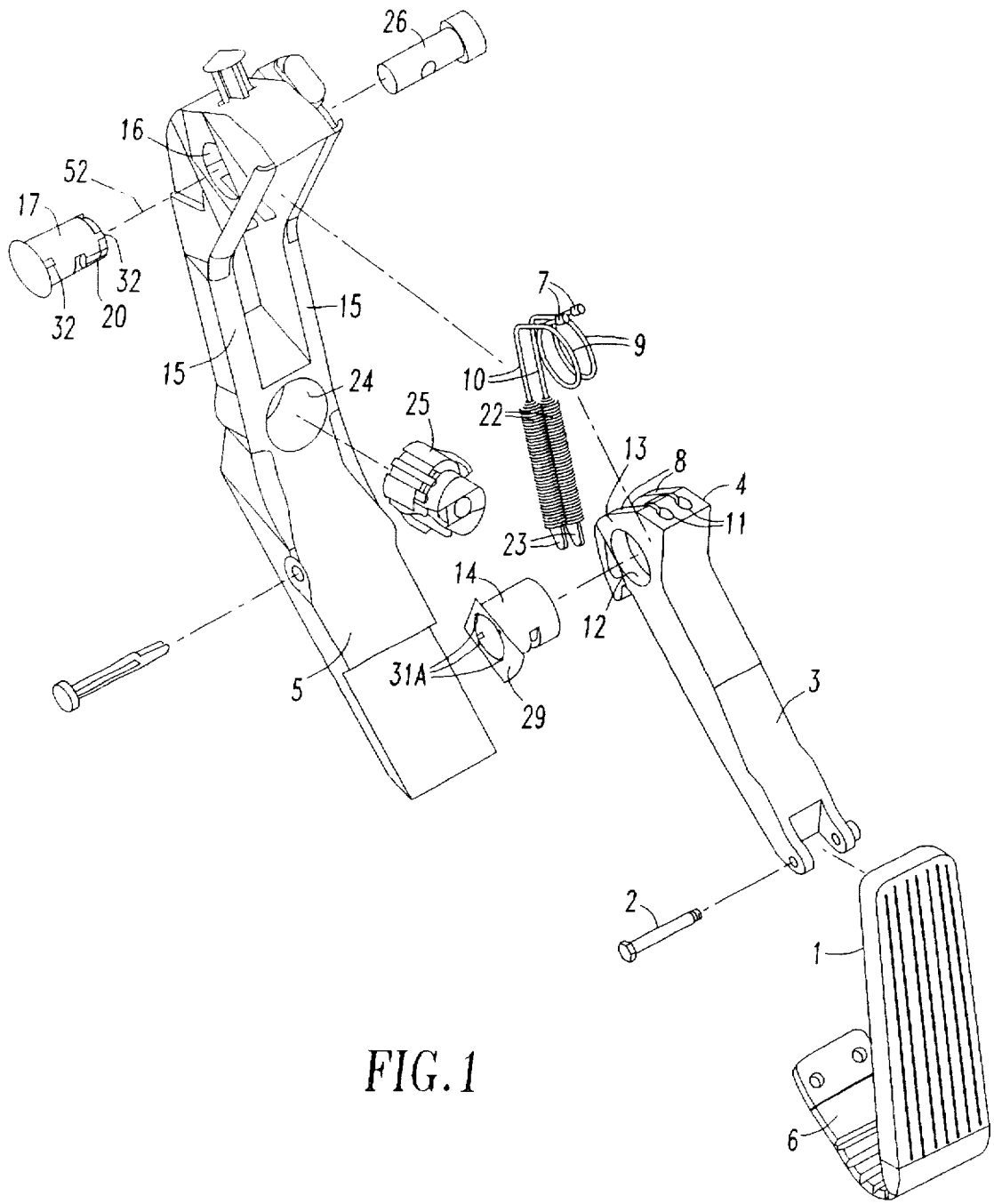
FIG. 1 is an exploded view of the control pedal unit according to the invention.

The control pedal unit comprises an control pedal 1 which is connected to one end of a pedal lever 3 by means of a pin 2 as it is common in the art. The pedal lever 3 has at its other end a bearing eye piece 4 by which it is pivotally supported on a mounting structure 5. If desired the pedal 1 may also at its end remote from the pin connection with the pivot lever be connected to the mounting structure 5 by way of a jointed connecting part 6.

The eye piece 4 is provided with partial circumferential slots 8 disposed side-by-side in parallel relationship and extending over part of the outer wall of the eye piece 4 for receiving the end portion of connecting cables 10. The end of each connecting cable 10 forms a loop 9. By way of the loop 9 each connecting cable 10 passes from the outside, via a partially circumferential slot 8, to the inside of the eyepiece 4, that is into the eyepiece opening. The inner circumferential wall that is the wall defining the opening of the eyepiece 4 includes two circumferential grooves 12 which are in radial alignment with the partially circumferential slots 8. The two loops 9 of the connecting cables 10 are placed into the two circumferential grooves 12. The ends of the connecting cables 10 are provided with nipples 7 which are received and retained in corresponding recesses 11 formed in the outer circumferential wall of the eyepiece 4.

The portions of the connecting cables 10 extending from the partial circumferential slots 8 are retained in guide slots formed in a rear portion of the eyepiece 4 which projects in the form of a cam structure 13. After being guided over the cam structure 13, the two connecting cables 10 are attached to the return springs 22 or the return springs are integrally formed with the connecting cable 10. The return springs 22 have, at their free ends, hooks 23 for mounting.

The cam structure 13 is formed so as to have different radii over its extent whereby different lever arms are obtained for the actuating forces of the springs 22 effective on the pedal lever 3. The cam structure shape is so selected as to provide for the vehicle operator a pedal position-dependent, that is, a vehicle speed-dependent pedal feel.

After placement of the cable loops 9 into the inner circumferential grooves 12, a stationary bearing sleeve 14 is inserted into the eyepiece 4. The bearing sleeve 14 forms a friction sleeve between the loops 9 and the inner circumferential wall that is, the bearing opening of the eyepiece 4 of the pedal lever 3.

The bearing sleeve 14 has an axial length which exceeds slightly the width of eyepiece 4. In this way, it is clamped between the legs 15 of the mounting structure 5 which at least in the area in which the lever 3 is mounted, has the cross-sectional shape of a U providing for an elongated cavity between the legs 15. The sleeve 14 is therefore firmly retained between the legs 15 without any play.

After the bearing sleeve 14 is positioned between the legs 15 of the mounting structure 5 so as to be in axial alignment with a bearing opening 16 in one of the legs 15 of the mounting structure 5, a slide hub 17 is inserted into the bearing sleeve 14 through the bearing opening 16.

The bearing sleeve 14 is provided, at its front end, with a frame-like positioning flange 29 by which the bearing sleeve 14 is properly located.

In order to insure that the bearing sleeve 14 is retained in its proper position in which its functional features are properly coordinated with features of adjacent components the slide hub 17 is provided with projections 20 and with stubs 32.

The inner end wall of the bearing sleeve 14 and the inner leg wall of the mounting structure 5 are provided, around the bearing opening 16, with cutouts 31A (FIG. 1) which are adapted in size to the size of the stubs 32. For the interconnection of the pedal lever 3 and the mounting structure 5, the slide hub 17 can be inserted, during assembly, through the bearing opening 16 into the bearing sleeve 14 only in a predetermined angular position in which the projections 20 are received in the corresponding asymmetrically arranged cutouts 31A in the bearing sleeve 14 in which they are lockingly engaged. When the parts are assembled the stubs 32 are disposed in the cutouts 31A of the bearing sleeve 14. In this way the bearing sleeve 14 as well as the slide hub 17 are firmly connected with the mounting structure 5 so as to be stationary.

The control pedal unit is designed for electronic or electrical communication with the vehicle engine. For this reason, a sender shaft 26 (FIG. 1) is inserted into the slide hub at the end thereof opposite its insertion end. The sender shaft may be a drive shaft for a potentiometer or a Hall sender capable of transmitting the position of the sender shaft 26 and, consequently, of the control pedal 1 electrically or electronically to the vehicle engine for controlling the engine.

The slide hub 17 serves two purposes: to mount the bearing sleeve 14 so that it is firmly located and to close the bearing sleeve 14 as it is held in the bearing sleeve in a simple manner by an engagement lock or by a clip connection and it serves as a friction bearing structure for the sender shaft 26.

The mounting structure 5 is provided with a recess 24 for the reception of a kick-down switch 25 used in connection with vehicles with automatic transmissions: For vehicles with manual transmissions a stop is provided in this area to limit pedal movement for full engine power output.

Figure 6:
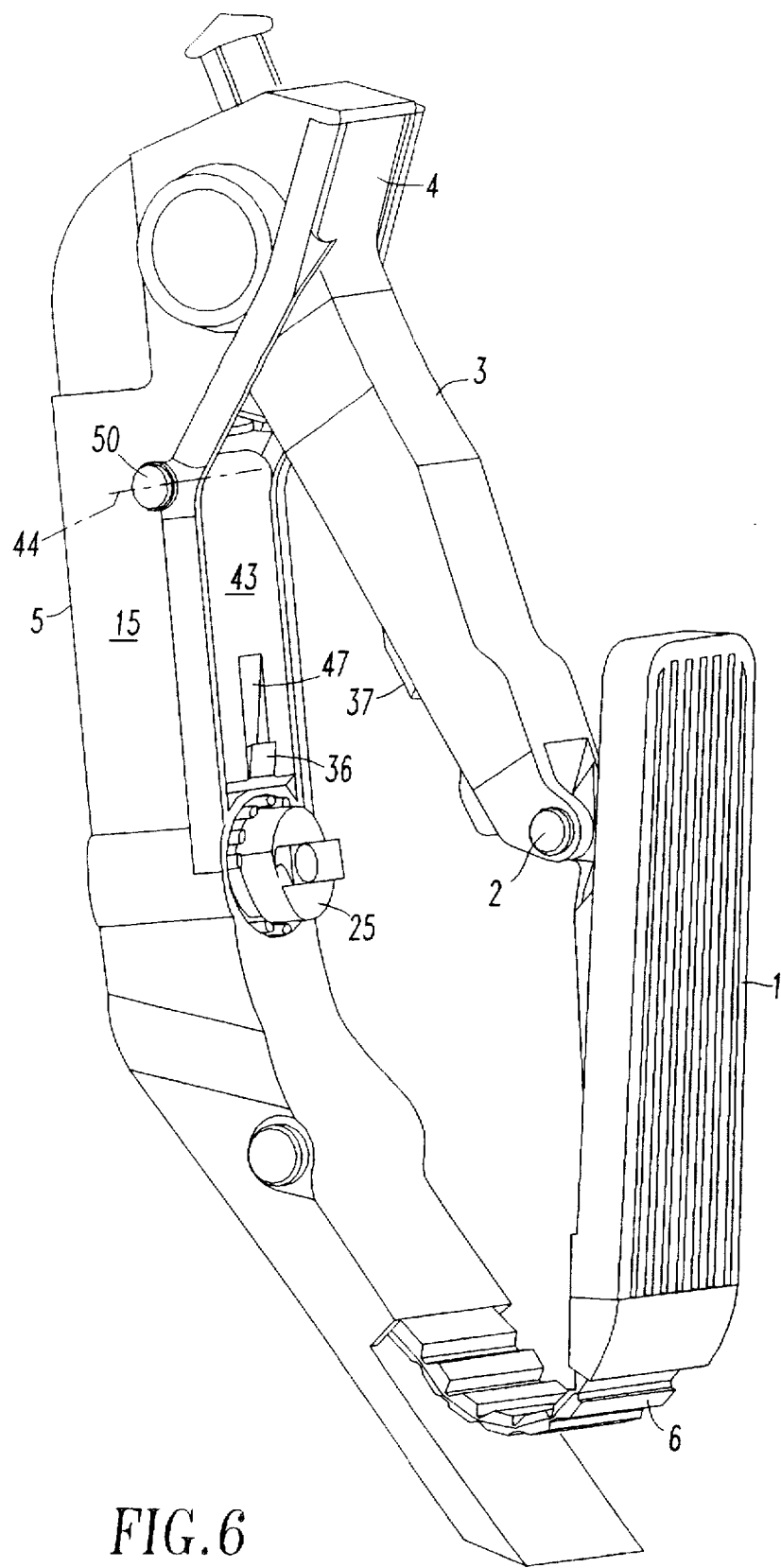
FIG. 6 is a perspective view of the control pedal unit after complete assembly.

To cover the cavity in the mounting structure 5, that is to cover the mounting structure 5 in the U-shaped area formed by the two leg walls 15 a cover 43 is provided which is supported on the mounting structure 5 pivotally about a pivot axis 44 (see FIG. 6). The cover 43 also serves as a support structure for the return springs 22. The springs 22 are so attached to the cover 43 that, with the particular mounting arrangement of the cover 43 on the mounting structure 5, they can be rapidly and easily installed.

After the loops 9 are placed into the circumferential grooves 12 and the nipples 7 are placed into the recesses 11 of the pedal lever 3, the hooks 23 of the return springs 22 are hooked each onto a web 45 of the cover 43. The two webs 45 project from the bottom end of the cover 43 and form the side directed toward the mounting structure 5. The hooks 23 are inserted into bores 46 in the webs 45.

Figure 2:
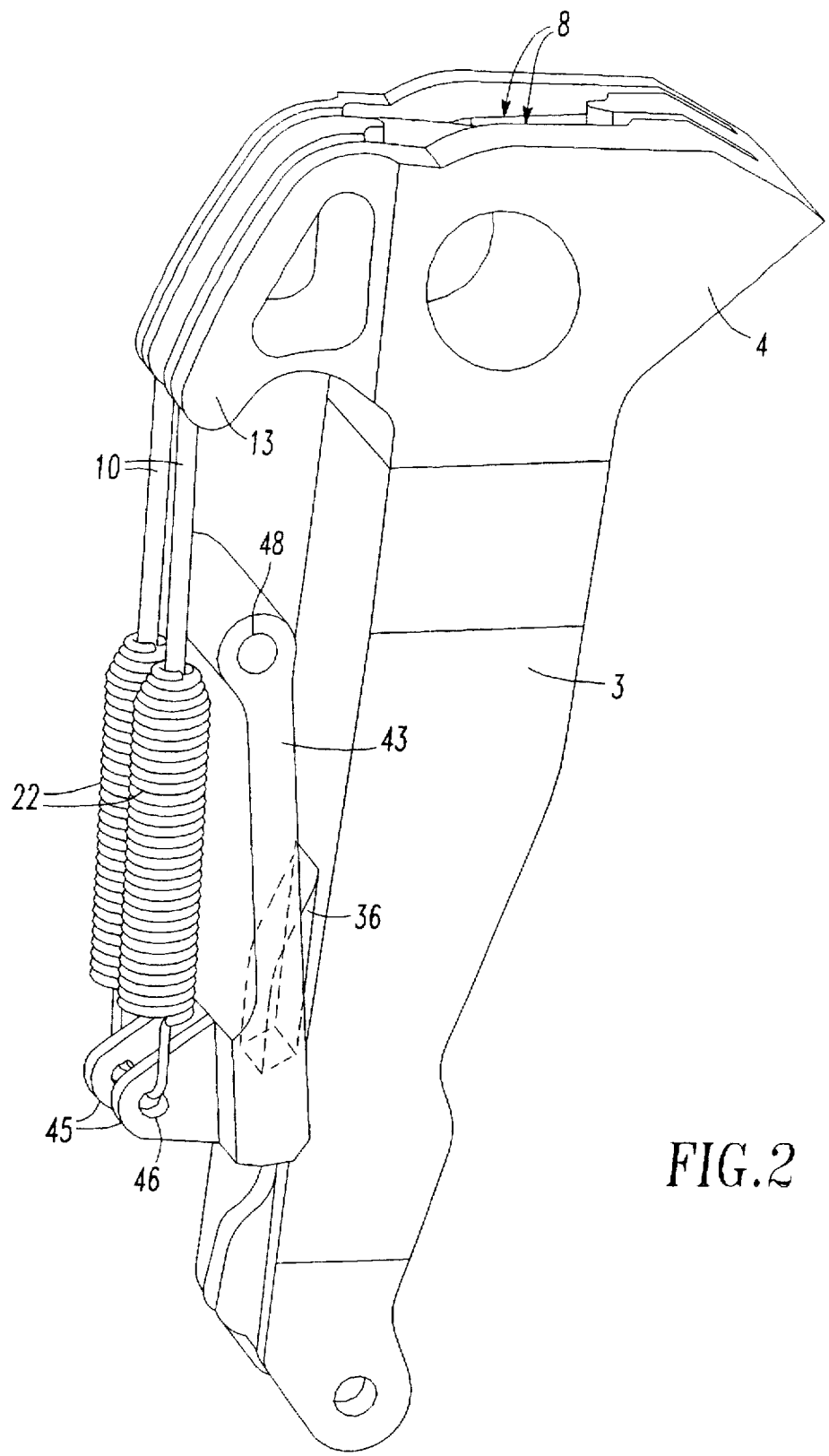
FIG. 2 is a perspective view of the control pedal with a cover before mounting to the support structure.

FIG. 2 shows this preassembly stage of the pedal lever 3. As can further be seen from this figure and particularly from FIGS. 3 and 4, the pedal lever 3 is provided at its back side with a hook 36. A counter hook 37 projects from the front side of the cover 43. The hooks 36 and 37 are inclined in a complimentary way such that the cover 43 can be attached by these hooks under slight tension of the springs 22 to the pedal lever before the pedal lever is mounted onto the mounting structure 5 in order to facilitate assembly.

Figure 3:
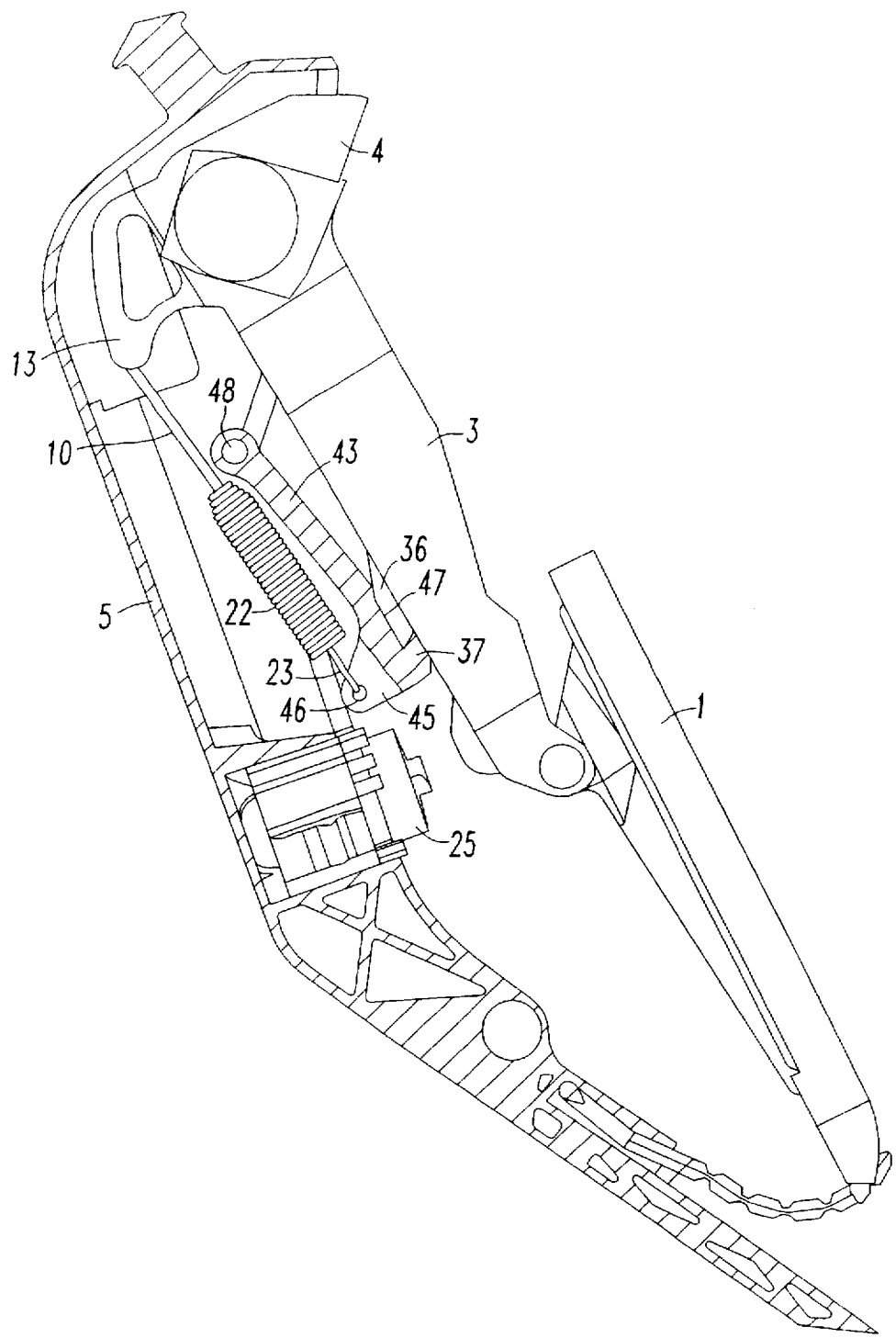
FIG. 3 is a side view partially in section of the control pedal unit before the cover is in its final position.
Figure 4:
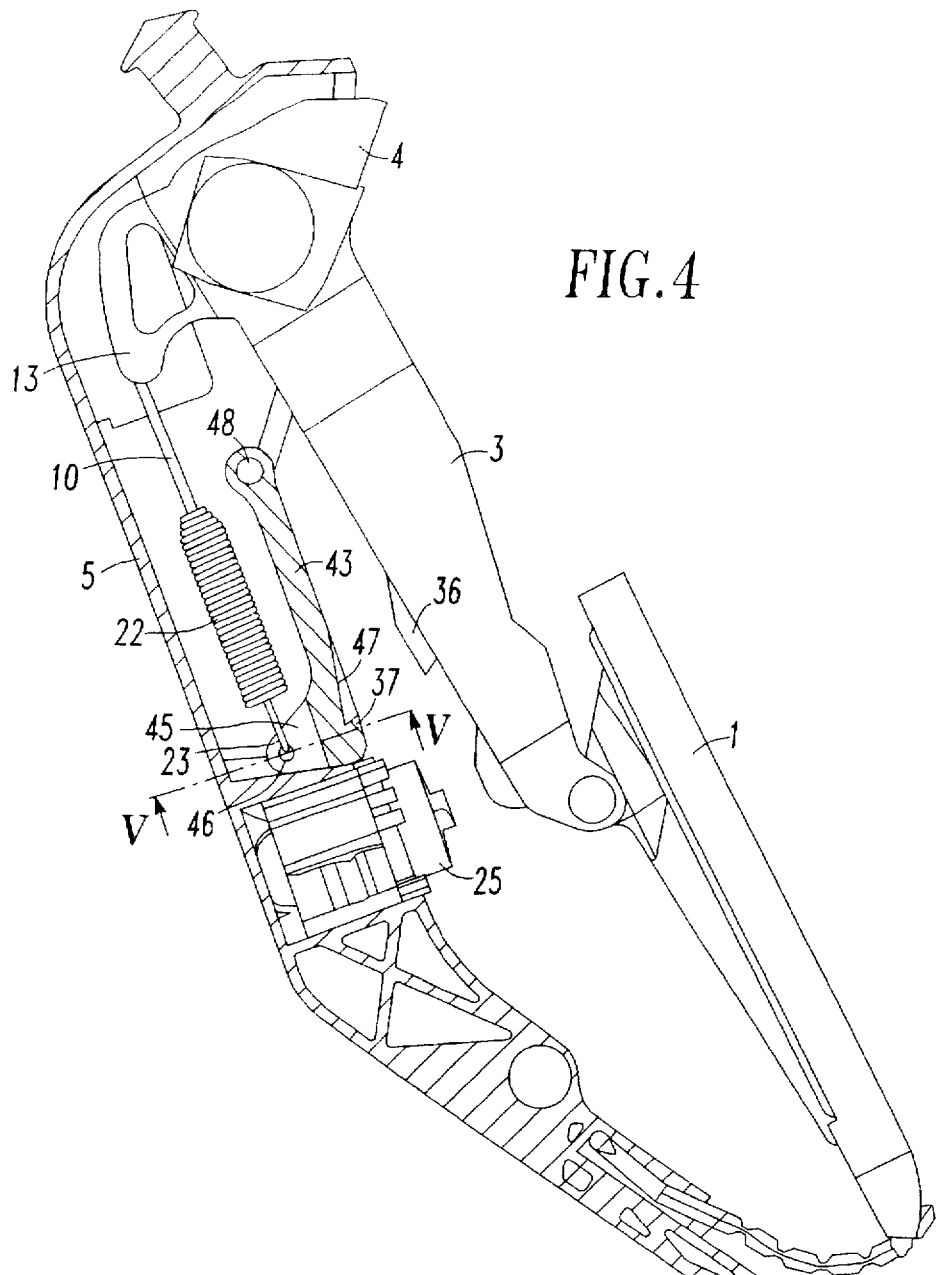
FIG. 4 is a side view like FIG. 3 wherein however the cover is pivoted onto the support structure.

As can be further seen from the figures the hook 36 has an extension or is so shaped that its portion adjacent the cover 43 serves as abutment for an abutment surface 47 formed on the cover 43. The abutment surface 47 is formed by an inclined recess in the surface of the cover 43 (see FIGS. 3,4, and 6), the extension or surface area of the hook 36 which is engaged by the abutment surface 47 of the cover 43 is formed and the abutment surface 47 are so shaped that the cover 43 is positioned thereby to extend essentially in planar alignment with the pivot axis 44 (see FIG. 7) in the mounting structure 5. This arrangement greatly facilitates assembly of the control pedal unit as can be seen from FIGS. 3 and 4. FIG. 3 shows an assembly state wherein the pedal lever 3 is already mounted onto the mounting structure 5 by the bearing sleeve 14 and the slide hub 17 (FIG. 1) but the cover 43 is still attached to the pedal lever 3 by means of its counterhook 37.

The preassembled pedal lever 3 as it is shown in FIG. 2 which comprises the components already described and which subsequently will be designated as pedal unit is pivotally mounted during assembly (see FIG. 7) to the mounting structure 5 by insertion of the slide hub 17.

Subsequently, the pedal unit with all attached components is rotated about a pivot axis 52 which extends concentrically with the slide hub 17 (see FIG. 1) such that the bearing opening 48 in the cover 43 is brought into axial alignment with the bearing bore 49 in the mounting structure 5 and a bolt 50 is then inserted through the bearing bore 49 and the bearing opening 48.

When the pedal assembly is subsequently pivoted about its pivot axis 52 toward the mounting structure 5, the cover 43 pivots about the pivot axis 44 and is moved along the pedal lever 3 such that the engagement between the hook 36 and the counter hook 37 is released whereby, because of the forces of the return springs 22 acting on the cover 43, the cover 43 is pivoted back to its predetermined end position as shown in FIG. 6 thereby closing the cavity between the U-shaped legs 15 of the mounting structure 5 and covering the springs 22.

Figure 7:
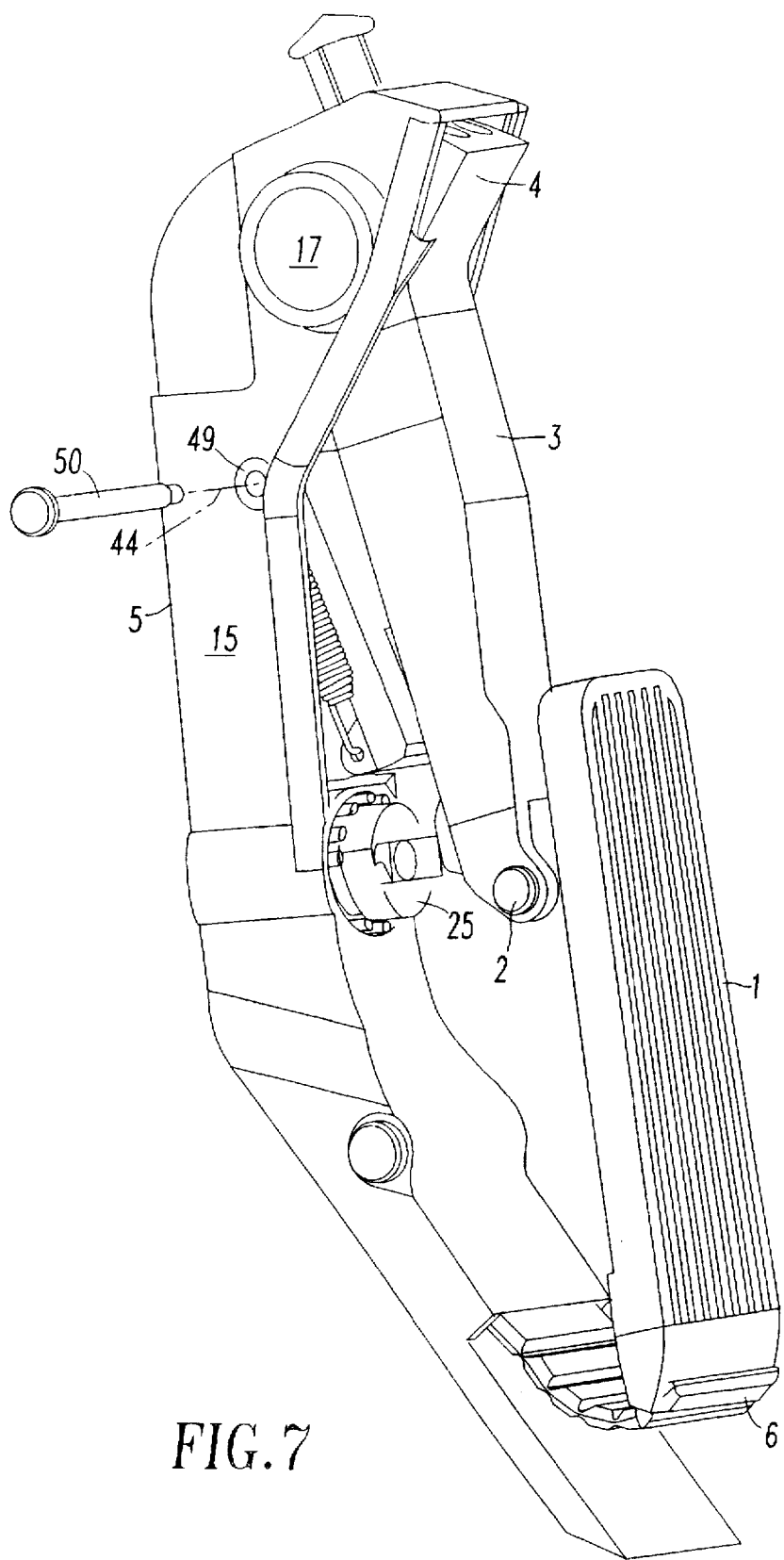
FIG. 7 is a perspective view of the control pedal unit during assembly.

The assembly procedure is apparent from FIG. 7 as mentioned earlier whereas FIG. 6 shows the control pedal unit fully assembled.

Figure 5:
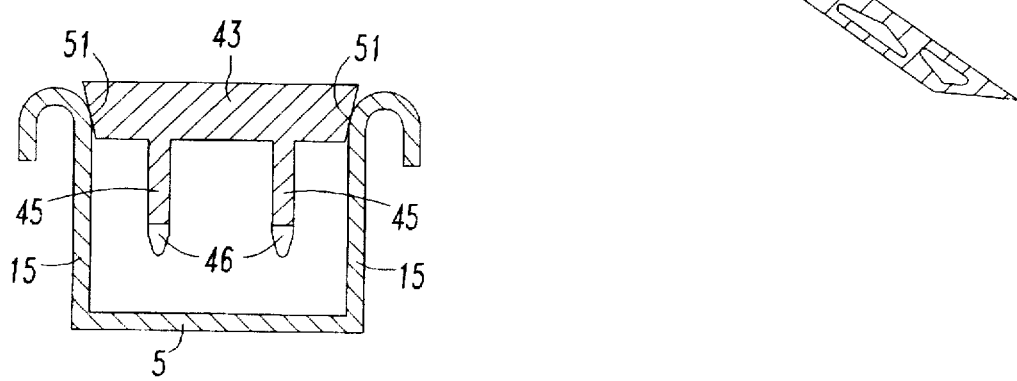
FIG. 5 is a cross-sectional view taken along line V—V if FIG. 4.

As shown in FIG. 5, the cover 43 is recessed between the U-shaped legs 15 of the mounting structure 5 such that its outside surface is essentially flush with the ends of the legs 15, the longitudinal sides of the cover have machined centering surfaces 51 and the top edges of the legs 15 are provided with a rounded flange.

The invention is not restricted to the exemplary embodiment described herein. It is for example possible to use a mounting structure 5 wherein the control pedal is mounted on a pedal lever 3 and is not hinged at the lower end to the mounting structure 5 or the vehicle floor.

What is claimed is:

1. A control pedal unit for vehicles comprising a mounting structure having a U-shaped mounting end with spaced parallel leg walls forming an elongated cavity a pedal lever having an eyepiece with an opening at one end forming a pivotal support where said pedal lever is pivotally supported in said elongated cavity between said spaced parallel leg walls, at least one return spring biasing said pedal lever to a rest position, and a cover disposed on said spaced parallel leg walls for closing said elongated cavity in said U-shaped mounting end and said cover being pivotally supported at one end thereof between said leg walls and said at least one return spring being engaged with said cover at the other end thereof such that said cover is held by said return spring in engagement with said leg walls so as to keep said cavity closed by said return spring which is hidden by said cover in said cavity.

2. A control pedal unit according to claim 1, wherein said pedal lever has a projection and said cover has a counter structure receiving said projection for engaging said cover with said pedal lever during assembly of said control pedal unit, said eyepiece opening defining the pivot support for said pedal lever and said cover being pivotally supported at its one end in spaced relationship from the pivot support for said pedal lever such that said projection and said counter structure are disengaged when said pedal lever is actuated after said cover has been pivotally mounted to said leg walls and said cover is pulled into engagement with said leg walls by said return spring.

3. A control pedal unit for vehicles according to claim 2, wherein said projection into which said return spring is hooked is a web projecting from said cover inwardly into said elongated cavity toward said mounting structure.

4. A control pedal unit according to claim 2, wherein said projection and an area of said cover abutting said projection are so shaped that said cover, when attached to said pedal lever before attachment to said mounting structure, assumes a position in which a pivot bearing opening in said cover is essentially aligned with a pivot bearing support bore in said leg walls when said pedal lever is mounted to said mounting structure.

5. A control pedal unit according to claim 4, wherein said cover is pivotally attached to said mounting structure by a bolt extending through said pivot bearing opening and said pivot support bore.

6. A control pedal unit for vehicles according to claim 1, wherein said pedal lever and said cover have cooperating attachment means for engagement with one another and said return spring which is connected with one end to said pedal lever is at its opposite end hooked into a web projecting from said cover for firmly engaging said cover with said pedal lever before said pedal lever is mounted on said mounting structure.

7. A control pedal unit according to claim 1, wherein said cover has inclined side surfaces for centering said cover on said leg walls.

8. A control pedal unit according to claim 1, wherein said eyepiece has an outer circumferential wall extending, around an interior space said return spring is connected to a cable whose free end is connected to said pedal lever at the outer circumferential wall of said eyepiece and said eyepiece includes a partial circumferential slot receiving said cable, said cable extending to the interior space of said eyepiece and forming a loop and then again to an area outside of said eyepiece and over a portion of said eyepiece which projects in the form of a cam shaped in such a way that, upon pivoting of said pedal lever, different lever arm lengths are provided for the action of said spring on said pedal lever.

* * * * *